April 7, 1964

O. D. AMICK, JR 3,128,402

DIRECT CURRENT GENERATOR

Filed May 17, 1962

INVENTOR

OWEN D. AMICK, JR.

BY *Robert Cobb*

ATTORNEYS

April 7, 1964  O. D. AMICK, JR  3,128,402
DIRECT CURRENT GENERATOR

Filed May 17, 1962

INVENTOR
OWEN D. AMICK, JR.
BY
ATTORNEYS

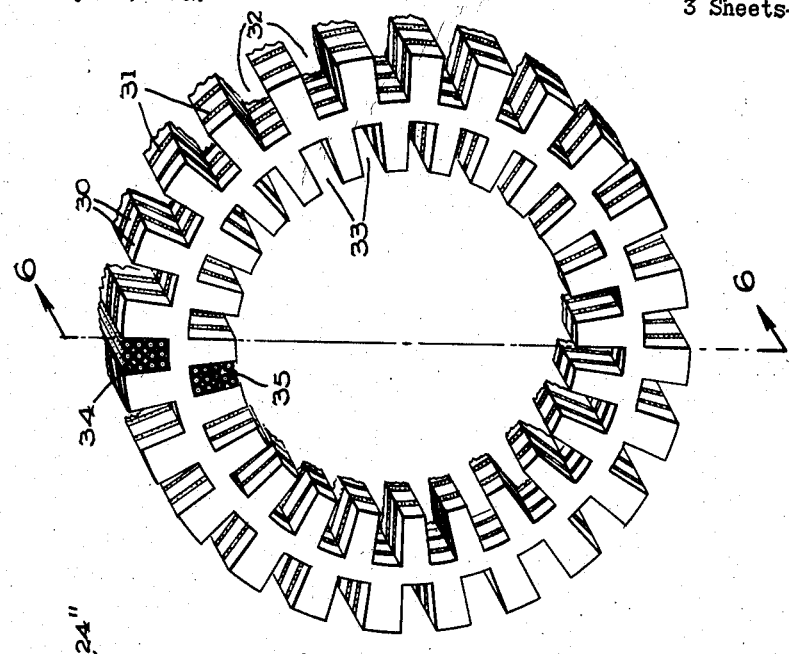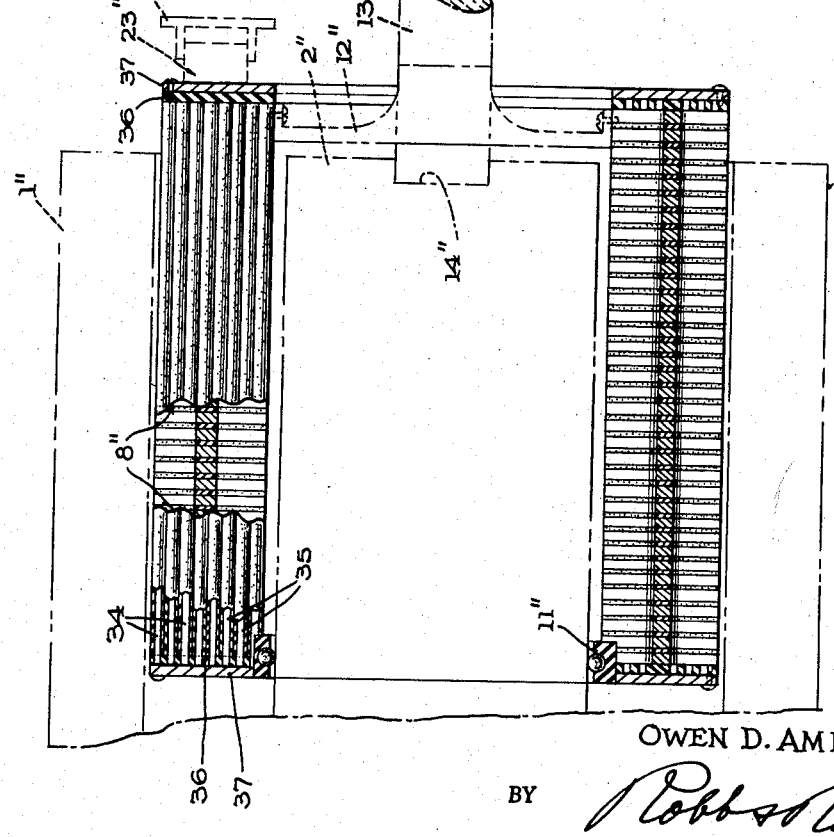

United States Patent Office 3,128,402
Patented Apr. 7, 1964

3,128,402
DIRECT CURRENT GENERATOR
Owen D. Amick, Jr., 425 5th Ave., Rear,
Huntington 1, W. Va.
Filed May 17, 1962, Ser. No. 195,483
5 Claims. (Cl. 310—178)

The present invention relates to electric generators and, more particularly, to an improved generator of the direct current type which is capable of producing a smooth and uniform direct current output without the need of the usual commutator that is normally required for conventional direct current generators.

In conventional generators of the direct current type, the magnetic field is produced by the use of one or more pairs of pole members arranged in equidistantly spaced relation to each other about a common axis, with each pole member having a field winding thereon which is so wound that the pole members are of alternately opposite magnetic polarity. Accordingly, when the armature conductors on the usual rotary armature of such a generator move past the successive pole members as the armature rotates about the common axis aforesaid, the current generated in each armature conductor reverses its direction of flow as it passes through the zone of each successive magnetic field produced by the respective pole members. The effect of this current reversal is essentially the generation of an alternating current in the armature conductors, and this alternating current must be converted to a direct current when the generator is of the direct current type. This conversion is usually achieved mechanically by what is known as a commutator which usually comprises an annular series of conductor bars electrically insulated from each other, said bars being engaged by conductive brushes which are so positioned as to collect the current from the armature conductors while the conductors are in a particular position within the magnetic field, thereby confining the output of the generator to a current flow which is conventionally considered a direct current. Nevertheless, such so-called direct current is not absolutely steady or uniform, and the efficiency of such generators is not as high as would be preferred in electrical machinery or equipment for power generation. This is attributed to a large extent to the fact that the magnetic field in which the armature conductors rotate is not uniform because of the conventional spacing of the field poles. Even when the faces of the field poles are annularly extended in the form of arcuate shoes, or otherwise, air gaps are still left between successive pole members, and the flux density at such gaps is substantially reduced, as well as elsewhere, particularly near the tips of the pole shoes or extensions. As the result, the current generated in the armature conductors substantially assumes the form of a sine wave, and by the use of the usual commutator, the output current generally corresponds to a series of half-waves. Accordingly, conventional D.C. generators do not achieve an effective E.M.F. greater than about 70.7 percent of the maximum E.M.F. output.

My invention represents a marked improvement over conventional D.C. generators by achieving a smoother and more uniform current output, accompanied by a substantially higher over all efficiency, especially when the output is considered in relation to the size of the generator.

One of the primary objects of my invention is to provide an improved D.C. generator which is highly efficient and effective in its operation, while being relatively simple and compact in construction, and which achieves a smooth and uniform current output without the need of the usual commutator bar and brush assembly or other comparable A.C. to D.C. conversion mechanism commonly applied and employed in conventional D.C. generators.

Another important object of my invention is to provide an improved generator as characterized in the preceding paragraph, wherein the magnetic field is continuous, uninterrupted and uniform around a central axis common to the axis of rotation of the armature which carries the conductors in which the current is generated in response to movement of the conductors through the magnetic field aforesaid as the armature rotates on its axis.

In achieving the latter objective, my generator essentially comprises a field magnet structure which includes a continuous and uninterrupted outer pole member of annular or cupped form and an inner cylindrical pole member of opposite magnetic polarity disposed co-axially within the outer pole member and uniformly radially spaced from the latter to define a uniform air-gap therebetween, and a rotary armature of generally annular form co-axially mounted in the air-gap aforesaid, said armature having a plurality of conductors arranged in parallel relation to each other, both physically and electrically, and axially extending within the air-gap from end to end of the armature and having appropriate current collector means at the opposite ends of the conductors for collecting the current generated therein responsive to rotation of the armature.

Other and further objects and advantages of the invention will be hereinafter described or will be apparent from the following description, and the novel features thereof will be defined in the appended claims.

Figure 4:
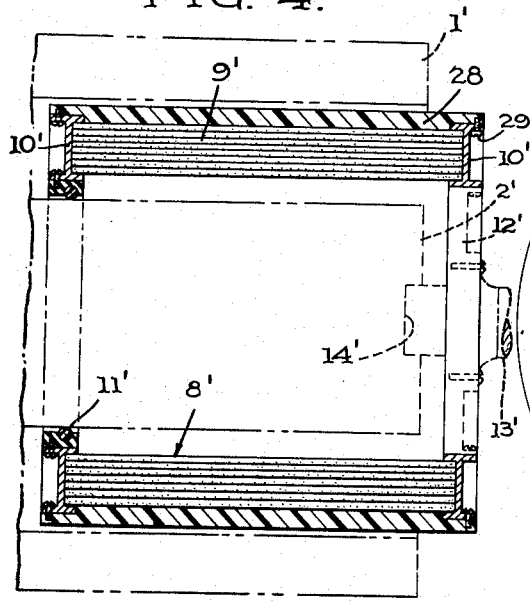
FIG. 4 is a fragmentary view of a modified form of the generator and principally embodying variations in the details of the armature as shown in longitudinal section as taken on the line 4—4 of FIG. 5, and with certain of the other elements of the generator assembly being shown fragmentarily in broken outline.

FIG. 6 is a fragmentary view of another modified form of the generator assembly and embodying principally further variations in the details of the armature as shown in longitudinal section as taken on the line 6—6 of FIG. 7, and otherwise generally corresponding to the structure as depicted in FIG. 4; and FIG. 7 is a fragmentary perspective view of the modified armature structure of FIG. 6 and depicting a slotted and laminated type of armature core or frame.

Like reference characters designate corresponding parts in the various figures of the drawings.

Figure 1:
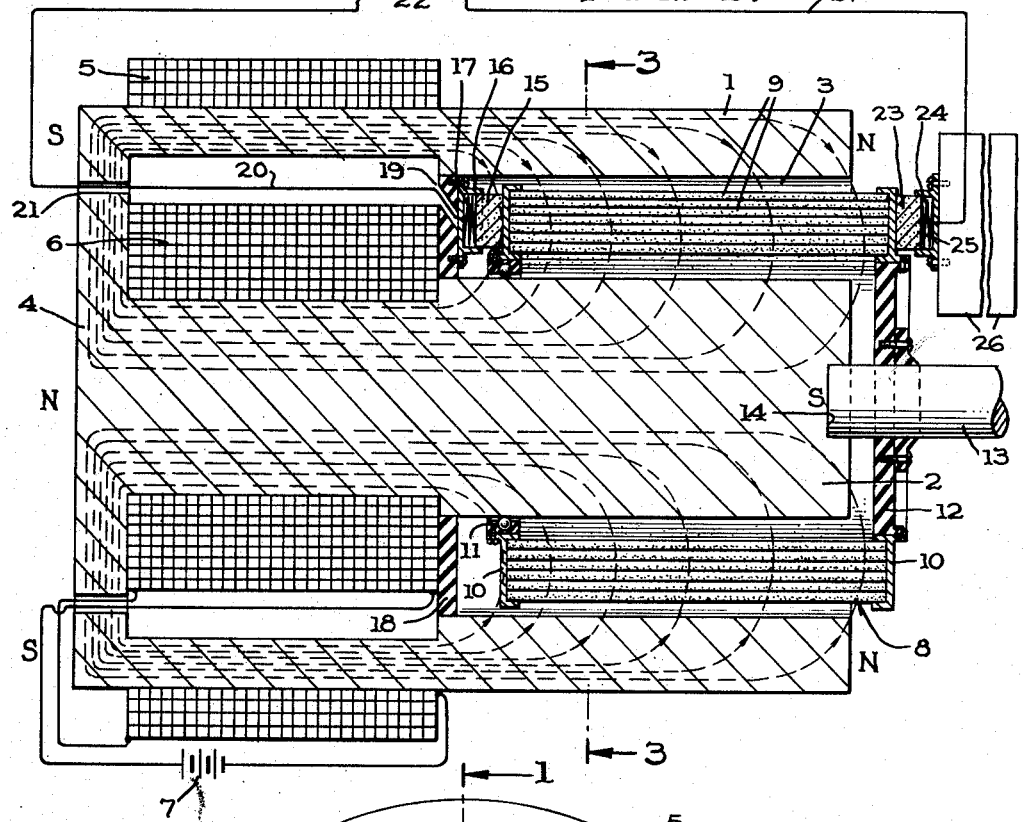
FIG. 1 is a somewhat diagrammatic view in longitudinal cross section, as taken on the line 1—1 of FIG. 2 of a generator constructed in accordance with my invention.
Figure 2:
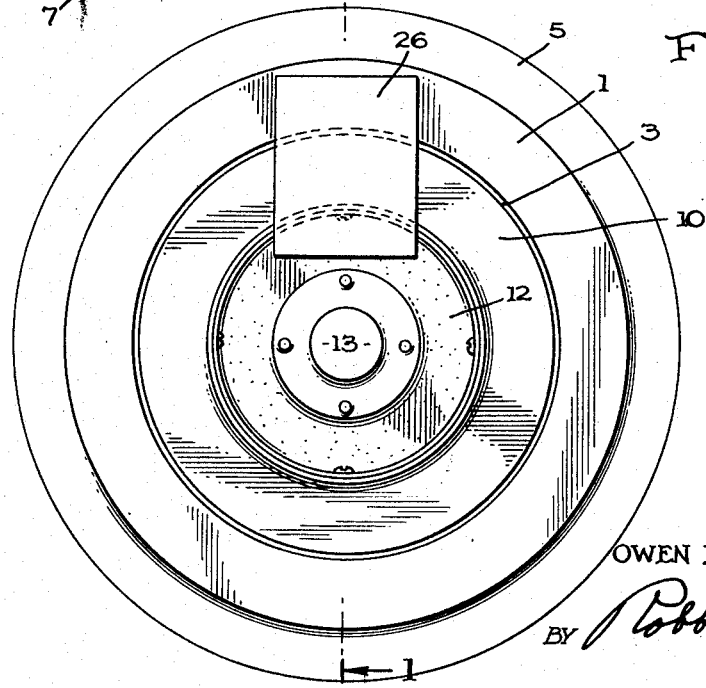
FIG. 2 is a view of the generator of FIG. 1 in end elevation as seen from the armature driving end of the assembly.
Figure 3:
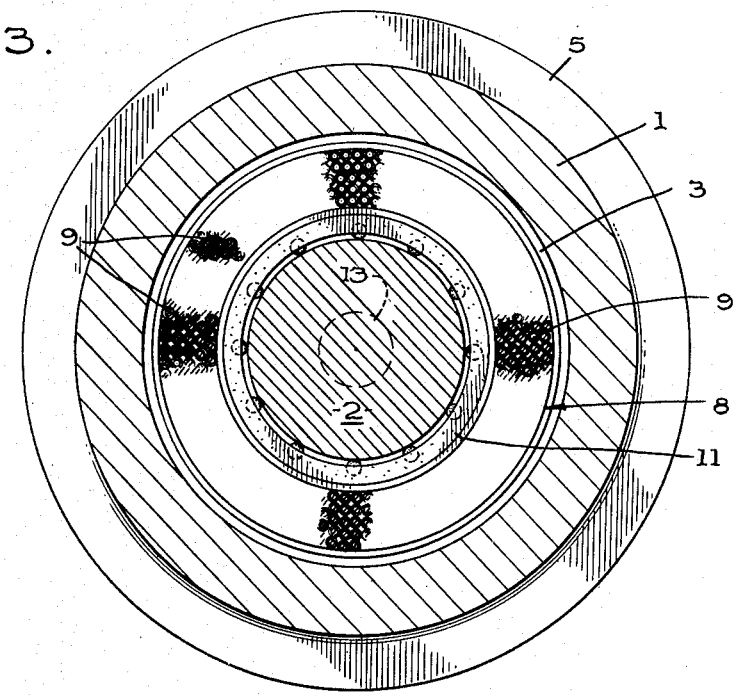
FIG. 3 is a transverse sectional view through the generator assembly as taken on the line 3—3 of FIG. 1.

Referring first to the form of my generator assembly as depicted in FIGS. 1 to 3 inclusive, it will be observed that the field magnet structure has the form of an annular pole member designated 1 of any suitable axially extended length, and an inner cylindrical pole member designated 2 which is co-axially disposed within the outer member 1 and is uniformly spaced radially therefrom to define an annular air-gap 3 therebetween. Both of the members 1 and 2 are preferably formed of magnetic material and, if desired, one end of the outer member may be closed by transversely extended bridge 4 which may constitute an integral part of the inner member 2, if desired, or may be formed separately therefrom, if preferred, by having appropriate means for mounting the inner member 2 thereon to maintain the latter in a fixed co-axial position within the outer member 1. The outer and inner members may either be provided with appropriate field windings respectively extending annularly thereabout, as indicated at 5 and 6, respectively, or, in the alternative, the members 1 and 2 may have the form of permanent magnets. In either case, the members 1 and 2 must be of opposite magnetic polarity, and serve to establish a magnetic field as diagrammatically represented by the broken lines and arrows in FIG. 1. Thus, at the open end of the field structure, which is the right-hand end as observed in FIG. 1 of the drawings, the magnetic lines of flux pass radially across the annular air-gap 3, and are uniformly distributed throughout the complete 360 degree circle about the central axis of the field magnet structure, as well as being substantially uniformly distributed axially along the air-gap.

The field coil windings 5 and 6 may be energized in any suitable manner, as by electrically connecting the same in series with each other and with an approximate source of electrical energy symbolically represented at 7, all as indicated diagrammatically in FIG. 1 of the drawings. Alternatively, the generator may be self-excited, if preferred.

Associated with the field structure is a rotary armature generally designated 8, said armature comprising a plurality of conductors 9 electrically insulated from each other, but arranged in contiguous parallel relation to each other and forming a hollow annular cylinder or ring, with the conductors extending axially within the air-gap 3 from the open end of the latter, and being radially spaced from the outer and inner pole members 1 and 2, respectively, so as to be freely rotatable in the air-gap about the central axis of the field structure. At the extreme opposite ends of the conductors 9, each conductor of the armature is electrically connected to a collector ring 10 of conductive material, said collector rings preferably being in the form of annular channel members in which the assembly of conductors is recessed at each end of the armature. The respective armature conductors preferably are of a size to make them substantially rigid and stiff throughout their length between the collector rings 10, 10, and accordingly, may be generally described as conductor bars or rods.

At the inner end of the armature, the collector ring 10 is suitably mounted on an annular anti-friction bearing, such as a ball bearing assembly of annular form and of non-conductive material, as indicated at 11, the balls of which freely engage and bear upon the inner pole member 2 so as to rotatably support the inner end of the armature and maintain its co-axial relation with the inner and outer pole members.

At the outer end of the armature, the collector ring 10 is suitably fixed to a non-conductive disk or spider 12 to which a drive shaft 13 is suitably secured in any desired manner on the central axis of the disk or spider 12. The drive shaft 13 is rotatably supported in any suitable manner, as by extending the drive shaft inwardly through the disk or spider 12, with the extreme inner end of the shaft suitably seated in a central pilot-bearing cavity 14 formed in the end face of the inner pole member 2. By imparting rotation to the shaft 13, the armature 8 can be rotated freely and at any desired speed.

The collector ring 10 at the inner end of the armature 9 is slidably engaged by a brush member 15 which may be formed of carbon or any other suitable material, said brush member being supported in a holder 16 and being yieldably urged into sliding contact with the collector ring 10, as by means of a spring 17. The brush holder is suitably anchored to a supporting ring or disk 18 of annular form, said disk being composed of non-magnetic and non-conductive material and being seated on the forward end of the field coil 6. As best seen in FIG. 1, the supporting ring 18 completely closes the air-gap 3 at the rear of the armature, and is provided with an opening therethrough, as indicated at 19, through which a conductor extends from the brush holder 16 to one of the output terminals of the generator, said conductor being designated 20 and passing through an opening 21 preferably provided through the closed end of the field structure, so that the conductor can be extended to any convenient point where the output terminals 22 are accessibly located.

At the forward end of the armature there is a similar carbon brush 23 which is mounted in a holder 24 having a spring 25 for yieldably urging the brush 23 into sliding contact with the outer collector ring 10. The holder 24 is anchored to any suitably fixed part of the generator frame, as indicated at 26, and from the brush 23 a conductor 27 is extended to the other of the output terminals 22 of the generator.

Assuming that the field windings 5 and 6 are so arranged as to cause the open end of the outer pole member 1 to assume a north polarity when the field winding 5 is energized, and the inner pole member 2 at the corresponding end of the field structure to assume a south polarity when the winding 6 is energized, the flux distribution will generally correspond to that represented by the broken lines and arrows in FIG. 1, with the flux passing radially across the air-gap 3, and being uniformly distributed around the central axis of the field structure, as well as in an axial direction along the annular air-gap. Accordingly, when the armature is rotated by means of the drive shaft 13, the armature conductors 9 will uniformly and constantly pass through the magnetic field within the air-gap, with the result that a smooth and uniform direct current will be generated in said armature conductors, without any reversal of the current flow, and without ever dropping to zero as occurs in conventional direct current generators employing commutators or the like. The operation of the generator thus attains maximum efficiency, substantially greater than that attainable by conventional D.C. generators.

Figure 5:
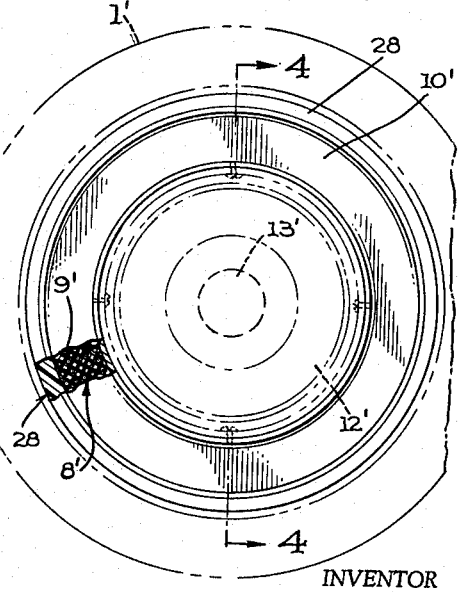
FIG. 5 is a view an end elevation of the assembly of FIG. 4, with a portion of the armature broken away and depicted in cross section to better disclose the details of the armature conductors and the surrounding reinforcing sleeve or shell therefor, and with other parts of the generator being represented in broken outline.

In instances where the size and/or speed of the generator is such as to require reinforcement or strengthening of the armature conductors intermediate their opposite ends, this can be achieved in a number of different ways, as more particularly represented by the two modifications representively depicted in FIGS. 4 and 5 and FIGS. 6 and 7. Referring first to FIGS. 4 and 5, the field and armature structures generally correspond to those of FIGS. 1 to 3 inclusive, as indicated by primed reference characters in FIGS. 4 and 5, but the outer periphery of the armature is encircled by and enclosed within a non-magnetic, non-conducting reinforcing tube or shell, as indicated at 28. The shell 28 can be made of plastic, fiberglass or other appropriate relatively rigid material, and the shell is suitably secured to the armature at its opposite ends in any desired manner, as indicated by the fasteners 29.

In the case of the modification depicted in FIGS. 6 and 7, the field and armature structures also generally correspond to those of FIGS. 1 to 3, as indicated by the double primed reference characters. In this instance, however, the armature is preferably of the laminated core type, wherein the core is composed of a series of alternately stacked rings of iron or other magnetic material, as indicated at 30, and rings of non-magnetic and non-conductive material, as indicated at 31. The rings 30, 31 are disposed in side-by-side abutting relation to each other until the core assumes the desired axial length, and the rings are alternately slotted at their outer and inner peripheries, as respectively indicated at 32 and 33 for the reception therein of two sets of armature conductors 34 and 35 respectively, said conductors of each group being electrically insulated from each other, and having their opposite ends extended through apertured disks 36, 36, preferably composed of non-conductive material, with the extreme opposite ends of the conductors being electrically connected to collector rings or disks 37, 37, said latter rings being engaged by appropriate brushes as in the first described form of the invention.

The operation of the modified forms of the invention is the same as that previously described, and will accordingly be obvious from the foregoing, without the need of further description.

Other changes and alterations may be made without departing from the spirit of my invention, as defined in the appended claims.

I claim:

1. A direct current generator, comprising a field magnet structure having the form of an outer axially extended tubular pole member of uninterrupted and continuous annular form and an inner cylindrical pole member disposed co-axially within the outer pole member in uniform radially spaced relation thereto for at least a substantial axial length thereof and defining an annular air-gap therebetween, said pole members being of opposite magnetic polarity in the zone of the air-gap aforesaid and serving to produce a continuous and uniformly distributed magnetic field radially across the air-gap between the pole members, and a rotary armature of annular form axially extended within the air-gap from one end of the pole members and co-axially mounted in relation to the pole members aforesaid, said armature including a laminated core having peripherally spaced conductor receiving slots alternately arranged in concentric circular series and having a plurality of conductors extending axially thereof and disposed in parallel relation to each other, with the conductors lying within the air-gap, and current collector means operatively co-acting with the respective opposite ends of the armature conductors.

2. A direct current generator, comprising a field magnet structure having the form of an outer axially extended tubular pole member of uninterrupted and continuous annular form and an inner cylindrical pole member disposed co-axially within the outer pole member in uniform radially spaced relation thereto for at least a substantial axial length thereof and defining an annular air-gap therebetween, said pole members being of opposite magnetic polarity in the zone of the air-gap aforesaid and serving to produce a continuous and uniformly distributed magnetic field radially across the air-gap between the pole members, and a rotary armature of annular form axially extended within the air-gap from one end of the pole members and co-axially mounted in relation to the pole members aforesaid, said armature including a laminated core having peripherally spaced conductor receiving slots alternately arranged in concentric circular series, the core laminations having the form of annular flat disks disposed in back-to-back relation and said armature having a plurality of conductors extending axially thereof and disposed in parallel relation to each other, with the conductors lying within the air-gap, and current collector means operatively co-acting with the respective opposite ends of the armature conductors.

3. A direct current generator, comprising a field magnet structure having the form of an outer axially extended tubular pole member of uninterrupted and continuous annular form and an inner cylindrical pole member disposed co-axially within the outer pole member in uniform radially spaced relation thereto for at least a substantial axial length thereof and defining an annular air-gap therebetween, said pole members being of opposite magnetic polarity in the zone of the air-gap aforesaid and serving to produce a continuous and uniformly distributed magnetic field radially across the air-gap between the pole members, and a rotary armature of annular form axially extended within the air-gap from one end of the pole members and co-axially mounted in relation to the pole members aforesaid, said armature including a laminated core having peripherally spaced conductor receiving slots alternately arranged in concentric circular series, the core laminations having the form of annular flat disks disposed in back-to-back relation and magnetically insulated from each other and said armature having a plurality of conductors extending axially thereof and disposed in parallel relation to each other, with the conductors lying within the air-gap, and current collector means operatively co-acting with the respective opposite ends of the armature conductors.

4. A direct current generator, comprising a field magnet structure having the form of an outer axially extended tubular pole member of uninterrupted and continuous annular form and an inner cylindrical pole member disposed co-axially within the outer pole member in uniform radially spaced relation thereto for at least a substantial axial length thereof and defining an annular air-gap therebetween, said pole members being of opposite magnetic polarity in the zone of the air-gap aforesaid and serving to produce a continuous and uniformly distributed magnetic field radially across the air-gap between the pole members, and a rotary armature of annular form axially extended within the air-gap from one end of the pole members and co-axially mounted in relation to the pole members aforesaid, said armature including a laminated core having peripherally spaced conductor receiving slots alternately arranged in concentric circular series, the core laminations having the form of annular flat disks disposed in back-to-back relation, and each core slot having a plurality of conductors seated therein, said conductors being disposed in parallel relation to each other, with the conductors lying within the air-gap, and current collector means operatively co-acting with the respective opposite ends of the armature conductors.

5. A direct current generator, comprising a field magnet structure having the form of an outer axially extended tubular pole member of uninterrupted and continuous annular form and an inner cylindrical pole member disposed co-axially within the outer pole member in uniform radially spaced relation thereto for at least a substantial axial length thereof and defining an annular air-gap therebetween, said pole members being of opposite magnetic polarity in the zone of the air-gap aforesaid and serving to produce a continuous and uniformly distributed magnetic field radially across the air-gap between the pole members, and a rotary armature of annular form axially extended within the air-gap from one end of the pole members and co-axially mounted in relation to the pole members aforesaid, said armature including a laminated core having peripherally spaced conductor receiving slots alternately arranged in concentric circular series, the core laminations having the form of annular flat disks disposed in back-to-back relation, and the core slots of one series opening radially outwardly of the armature, and those of another series opening radially inwardly of the armature and said armature having a plurality of conductors extending axially thereof and disposed in parallel relation to each other, with the conductors lying within the air-gap, and current collector means operatively co-acting with the respective opposite ends of the armature conductors.

References Cited in the file of this patent

UNITED STATES PATENTS

| | | |
|---|---|---|
| 351,902 | Eickemeyer | Nov. 2, 1886 |
| 2,846,599 | McAdam | Aug. 5, 1958 |
| 2,897,385 | Powell | July 28, 1959 |

OTHER REFERENCES

"Theory and Calculations of Electrical Apparatus," by C. P. Steinmetz, McGraw-Hill Co., pages 454–455, first edition 1917.